A. HAUBER.
METHOD OF CLEANING FISH.
APPLICATION FILED JULY 14, 1914.
1,134,530.
Patented Apr. 6, 1915.
2 SHEETS—SHEET 2.
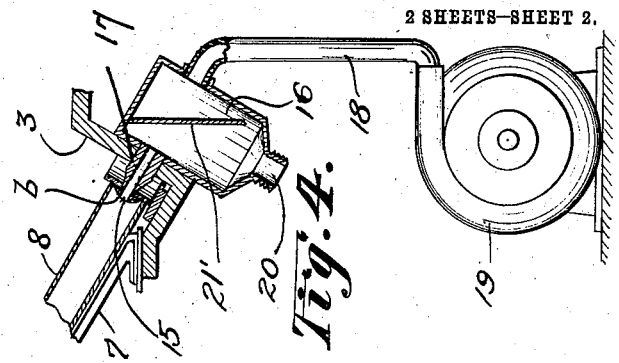
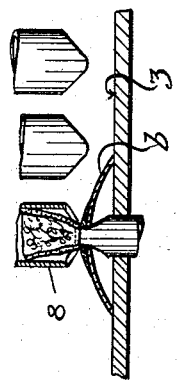
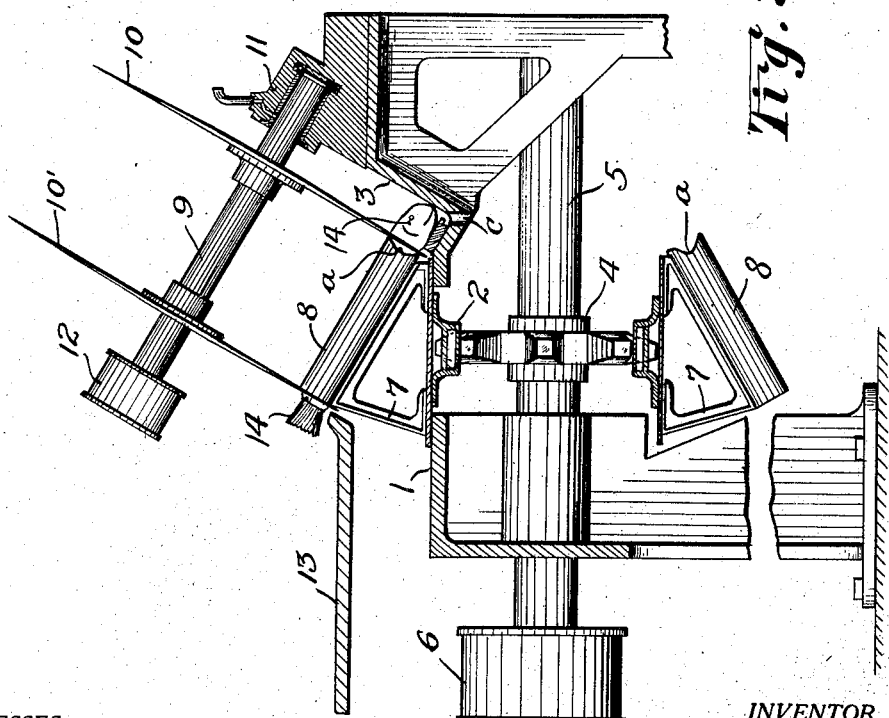
WITNESSES:
Elbert R Bronner
Wm F Booth
INVENTOR.
August Hauber
BY Acker & Totten
his ATTORNEYS.

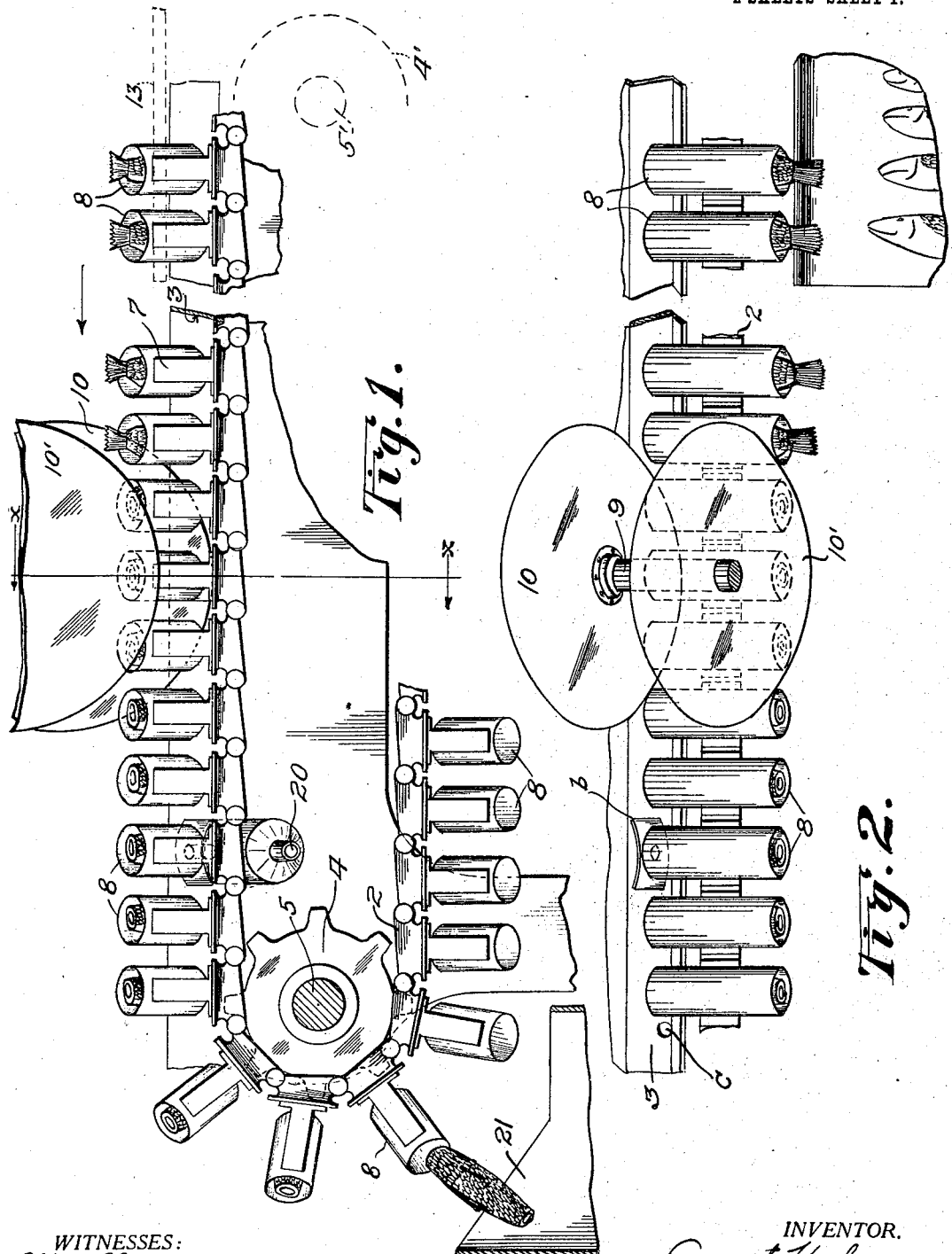

UNITED STATES PATENT OFFICE.

AUGUST HAUBER, OF HAYWARD, CALIFORNIA, ASSIGNOR TO F. E. BOOTH, OF SAN FRANCISCO, CALIFORNIA.

METHOD OF CLEANING FISH.

1,134,530.   Specification of Letters Patent.   Patented Apr. 6, 1915.

Application filed July 14, 1914. Serial No. 850,854.

*To all whom it may concern:*

Be it known that I, AUGUST HAUBER, a citizen of the United States, residing at Hayward, in the county of Alameda and State of California, have invented certain new and useful Improvements in Methods of Cleaning Fish, of which the following is a specification.

The hereinafter described invention relates to a method for the cleaning of fish generally, being more particularly adapted for the cleaning of fish in connection with canning establishments; the object of the invention being to facilitate the cleaning of the fish and to provide for a cleaner and more effectual cleaning than is at present accomplished by the hand method of cleaning, which latter method is to cut open the fish and remove by hand therefrom the entrails, which ofttimes results in a mutilation of the fish and more frequently in an imperfect cleaning thereof. By the hereinafter described method the entrails are quickly and perfectly removed from the fish, and this without in any manner mutilating the fish or destroying the appearance thereof for packing purposes.

The invention consists in opening the fish for access to the interior thereof, either by removing or severing the head from the body or by cutting the fish back of the head in such a manner as to open communication with the interior thereof, and presenting the cut fish in such a manner to the action of suction means as will permit of the entrails being quickly withdrawn from the fish through such cut portion thereof, all of said entrails being removed at a single operation and the fish left in perfect condition for packing or canning purposes.

Any suitable form of mechanism may be employed for carrying out the described method for the cleaning of fish, but preference is given to the form herein illustrated, due to the fact that it represents a practical working machine designed and placed into operation for the working of the present method.

In the drawings Figure 1 is a part broken view, in side elevation, of the apparatus, illustrating the endless carrier with the holders for the fish, the position of the cutting devices relative to the fish runway, and the suction means for withdrawing the entrails from the fish. Fig. 2 is a top plan view of the parts disclosed by Fig. 1 of the drawings. Fig. 3 is a vertical sectional end view of the apparatus taken on line *x—x* Fig. 1 of the drawings, and viewed in the direction of the arrow. Fig. 4 is a detail vertical sectional view of the suction container for receiving the withdrawn entrails, with the suction pump applied thereto. Fig. 5 is a detail view illustrating one of the holders with the fish therein positioned for the action of the suction means. Fig. 6 is a detail end view of one of the holders for the fish to be cleaned.

In the drawings, the numeral 1 is used to designate the runway for the endless carrier 2, said runway at one side thereof being provided with a guard wall 3. The endless carrier 2 works over the sprocket wheels 4 and 4′ mounted on the shafts 5 and 5′ located respectively at each end of the runway 1, rotation being imparted to shaft 5 by means of a power driven belt (not shown) working over a belt pulley 6 secured to the projecting end of said shaft.

From the endless carrier 2 upwardly projects a series of spaced supports or brackets 7, each being in the present case inclined toward the guard wall 3, and to each of said brackets is secured a transversely disposed holder 8 for the fish to be operated on. In the present case these holders are illustrated as tubular in form, but the shape thereof is immaterial just so long as they will properly hold the fish placed thereon. Owing to the inclination of the brackets 7, it is obvious that the holders 8 will lie at an inclination to the horizontal, so that when a fish is placed therein the nose of the same will rest against the guard wall 3, which stands at an outward inclination.

Within the runway 1 is mounted on a shaft 9 for rotation the spaced cutting disks 10—10′, the distance between the cutting disks or blades being such as to permit of the holders 8 passing between the inner walls thereof. In the present case the shaft 9 is mounted within a bearing 11 secured to the upper face of the guard-wall 3, and rotation is imparted thereto by a drive belt (not shown), working over a belt pulley 12 secured to the outer end of the said shaft. However, it will be understood that any suitable means may be employed for imparting high rotative speed to the shaft 9, and equally so that any suitable means may be employed for imparting rotation to the drive-shaft 5 for actuating the endless carrier 2.

To one side of the runway for the endless carrier and in advance of the cutting instrumentalities 10 and 10' is located a platform 13 for the reception of the fish to be cleaned, which fish are piled on said platform and by an attendant, there stationed, fed into the holders 8 as carried by said station by the endless carrier. Each holder is of a length somewhat less than the length of the fish to be cleaned, so that when the fish 14 are placed within the holders the head and tail thereof project beyond the respective ends of the holder, the nose of the fish, due to the inclination of the holder, bearing against the inner face of the guard wall 3. As thus positioned, the tail and head of the fish are moved within the sphere of the cutting instrumentalities by the travel of the endless carrier and as conveyed forwardly the head and tail are severed from the fish, and in this condition the fish is carried toward the suction opening 15 in the guard wall 3 a short distance beyond the sphere of the disks or cutting instrumentalities 10 and 10'. Each holder 9 is slightly cut away, as shown at $a$, so as to ride over the convex surface $b$ in the guard wall 3 adjacent the suction opening 15 thereof, so that the head end portion of the fish will come in perfect registry with the said suction opening during the forward travel of the endless carrier.

The suction opening 15 is connected with a container 16 by a short connection or conduit 17, and by a pipe connection 18 the container 16 is connected to a suction motor 19. This suction motor is in constant action, so the moment the head end of the fish with its severed head is brought into registry with the suction opening 15, the entrails of the fish are drawn through the conduit 17 into the container 16, discharging therefrom through the outlet 20 which leads to a suitable place of deposit. To prevent the entrails entering the connection 18, there is arranged within the container 16 a baffle plate 21', which deflects the inflowing entrails toward the bottom of the said container. Such blood as flows during the severing of the head from the fish, escapes from the runway 1 through the drain outlet $c$, Fig. 3 of the drawings.

Owing to the inclination of the holders 8 during the upper run of the endless carrier the head end of the fish will constantly bear against the inner face of the guard wall 3, the size of the holder being sufficient to permit of free movement of the fish. As the holder with the cleaned fish contained therein is carried by the endless carrier over the sprocket wheel 4, the tail end portion of the fish will be at a downward inclination and the same will slip from within its holder onto the discharge chute 21—Fig. 1 of the drawings.

Having thus described my invention what is claimed as new and is desired to be protected by Letters Patent is:—

1. The method of cleaning fish which consists in first cutting the fish for obtaining access to the interior thereof and thence withdrawing the entrails through said cut portion of the fish by the application of suction thereto.

2. The method of cleaning fish which consists in first severing the head from the fish for obtaining access to the interior thereof, and thence withdrawing the entrails through said cut portion of the fish by the application of suction thereto.

3. The method of cleaning fish which consists in first cutting the fish for obtaining access to the interior thereof and thence presenting said cut portion to a suction device for the withdrawing of the entrails therefrom.

In testimony whereof I have signed my name to this specification in the presence of two subscribing witnesses.

AUGUST HAUBER.

Witnesses:
 HARRY A. TOTTEN,
 D. B. RICHARDS.